July 29, 1969     W. E. MANGAS     3,457,813
SPRING LOADED CHUCK KEY
Filed Aug. 31, 1967
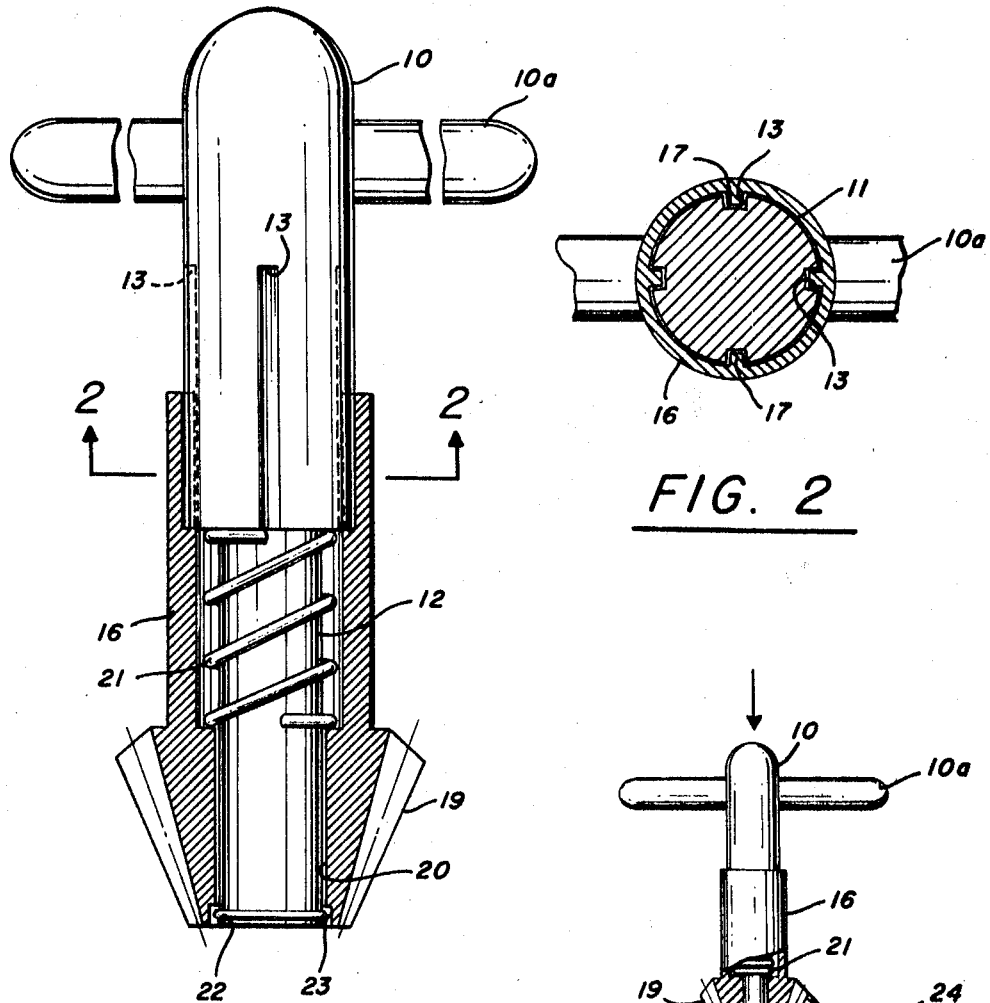
FIG. 1
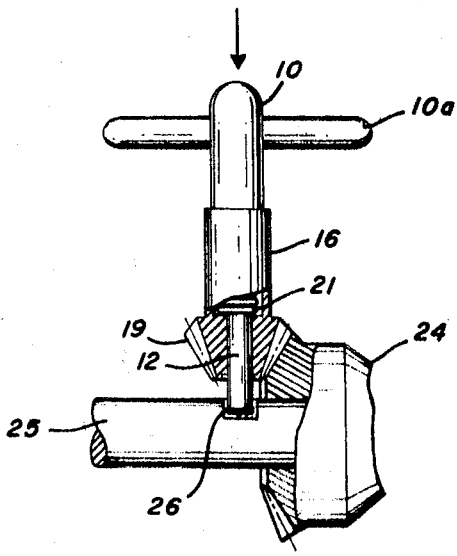
FIG. 2
FIG. 3
INVENTOR.
WALTER E. MANGAS
BY Thomas Glenn Keough
ATTORNEYS 3,457,813
SPRING LOADED CHUCK KEY
Walter E. Mangas, Rte. 6, Defiance, Ohio 43512
Filed Aug. 31, 1967, Ser. No. 665,674
Int. Cl. B25b *13/00, 13/44, 13/48*
U.S. Cl. 81—90               4 Claims

ABSTRACT OF THE DISCLOSURE

A chuck key for adjusting a chuck mounted on rotary machinery is provided which includes a shaft having a splined portion and a coaxially extending guide portion. A sleeve mounting a beveled gear has its internal surface shaped to be carried on the splined portion to permit axial motion only. A retaining ring on the furthest extension of the guide portion holds the gear and sleeve on the splinded portion. A helical biasing spring wrapped around the guide portion forces the gear and sleeve away from the splined portion and against the retaining ring. Thus disposed, the chuck key cannot operatively engage a chuck since the guide portion cannot be inserted into a chuck keyhole. However, upon overcoming the biasing spring force by an opposed axial force that permits insertion of the guide portion into the chuck keyhole, the beveled gear can engage the chuck to tighten or loosen it. Therefore, the danger of a chuck key being left in a chuck when the machinery is started is eliminated, since the chuck key will pop out of the chuck keyhole when the opposed axial force is released.

Statement of Government interest

The invention described herein may be manufactured and used by or for the Government of the United States of America for governmental purposes without the payment of any royalties thereon or therefor.

Background of the invention

Power chucks securing drills, taps, or similar tools require a chuck key for adjusting the chuck in accordance with the size of the drill or tap. It has been found that operators, especially inexperienced operators, will, on occasion, forget to remove the chuck key from the chuck keyhole after an adjustment has been made. This situation is particularly dangerous since the chuck key, upon being whirley about the power shaft, can cause injury to the operator or persons nearby. Such improper use of all conventional chuck keys produces this unsafe condition.

Summary of the invention

The present invention is directed to providing a safety chuck key which includes the shaft having a splined portion and a coaxially extending guide portion. A sleeve mounting a beveled gear at one end has its internal surfaces formed to fit on the splined portion for permitting only an axial motion. A retaining means is carried on the furthermost end of the guide portion to prevent the sleeve and gear from coming off the splined portion. A biasing means forces the sleeve and gear against the retaining means to prevent insertion of the guide portion in a chuck keyhole. Upon overcoming the biasing force by an opposed axial force, the guide portion may be inserted in the chuck keyhole to allow operative engagement of the chuck key with a chuck.

It is an object of the invention to provide a chuck key for adjusting a power chuck.

It is a further object of the invention to provide a chuck key that can be inserted in a chuck keyhole only when forced therein.

It is an additional object to provide a biasing means that prevents insertion of a chuck key in a keyhole unless the biasing force is axially overcome.

It is an ultimate object of the invention to provide a chuck key which minimizes the possibility of injury to an operator.

Brief description of the drawings

FIG. 1 is a sectional view of the chuck key.
FIG. 2 is a sectional view of the chuck key taken along lines 2—2 in FIG. 1.
FIG. 3 is a perspective view partially in section of the chuck key in operative engagement with chuck.

Preferred embodiment of the invention

Referring now to FIG. 1 of the drawings, the chuck key is formed from a small shaft 10 provided with a turning lever 10b and having a machined splined portion 11 and an axially extending guide portion 12 being of smaller diameter than the splined portion. The splined portion is provided with a minimum of one longitudinally extending keyway 13, although it was discovered that four keyways, as shown, afforded greater stability. An outer sleeve 16, sized to fit about the splined portion, is provided with at least one radially extending key 17 each of which being disposed in a separate one of the longitudinally extending keyways for permitting only an axial motion on the splined portion.

A beveled gear 19 is formed with a bore which slidably receives the guide portion. The gear and sleeve may be machined out of a single piece of material or may be connected by conventional means. Within the space enclosed between the sleeve and the guide portion, a helical spring 21 is disposed wrapped around guide portion 12. The spring exerts an axial force between the splined portion and the gear carrying sleeve that tends to force the beveled gear past furthest extension of the guide portion.

A retaining ring 22, sweated or machine pressed onto the furthermost extension of the guide portion, prevents the beveled gear from being pushed off the guide portion, With the beveled gears provided with an annular recess 23, the gear, the retaining ring, and the guide portion assume a substantially flush relationship.

Turning now to FIG. 3, a rotary force transmitted through turning lever 10b to loosen a chuck 24 requires a pivotal fulcrum. This fulcrum is usually provided in a power shaft 25 as a chuck keyhole 26 sized to receive an extension of the chuck key. Rotary force is transmitted to the chuck via the extension-keyhole pivot point. A hazard attendant power chuck adjustment exists when a chuck key is left in the keyhole and projects beyond the power shaft since injury could occur to operating personnel if the power equipment were inadvertently turned on. Such a hazard is entirely eliminated with the instant invention.

In order that the beveled gear may operatively engage the chuck, a force (see arrow in FIG. 3), greater than and axially opposed to the biasing spring force, must be exerted to extend the guide portion to permit insertion in the keyhole. If the operator at any time releases this opposed force, the chuck key will automatically pop out of the chuck keyhole. Therefore, the operator's attention to the engagement or disengagement of the chuck key is essential when using the invention.

It is to be understood that while there has been described herein in detail and illustrated in the accompanying drawing a presently preferred embodiment of this invention, various modifications, omissions, and refinements which depart from the illustrated embodiment may be adopted without departing from the spirit and scope of the invention.

What is claimed is:
1. A safety chuck key comprising:
- a shaft member including a first end configured to be received in a cylindrical chuck keyhole and a second end adapted for manual rotation of said shaft member about the axis of said keyhole;
- a body member having an inner end and an outer end and being provided with an interior configured to support said shaft member for sliding movement along said axis and to transmit rotational torque from said shaft member to said body member;
- an external gear portion for engaging the gears of a chuck being mounted on said inner end and shaped with an internal annular recess;
- the resilient member positioned for urging said first end of said shaft member toward a recessed position within said hollow body member and holding said first end in a circumscribed relationship on said external gear portion; and
- a retaining ring secured to the extremity of said first end being sized to fit within said internal annular recess for ensuring a substantially coplanar relationship with an outer surface of said extremity and an outer surface of said gear portion.

2. A safety chuck key according to claim 1 in which said shaft member is provided with a means for imparting torque to the chuck gear and is further provided with a portion having longitudinally extending keyways and said body member is provided with a plurality of interiorly extending keys each disposed in a separate one of said keyways thereby permitting only limited motion on said shaft member.

3. A safety chuck key according to claim 2 in which said resilient member is a helical spring wrapped around said first end to insure said predetermined position.

4. A safety chuck key according to claim 3 in which said external gear is a beveled gear carried on one end of said hollow member.

References Cited

UNITED STATES PATENTS

| | | | |
|---|---|---|---|
| 1,489,976 | 4/1924 | Brown | 279—52 |
| 2,215,621 | 9/1940 | Slavik. | |
| 2,387,981 | 10/1945 | Davis. | |
| 2,388,414 | 11/1945 | Jernigan. | |
| 2,598,119 | 5/1952 | Goff | 81—71 |
| 2,609,719 | 9/1952 | Lilley. | |
| 2,618,995 | 11/1952 | Droege. | |
| 2,660,081 | 11/1953 | Dossie. | |
| 2,690,690 | 10/1954 | Garton. | |

LEONARD H. GERIN, Primary Examiner

U.S. Cl. X.R.

279—1